United States Patent Office 3,325,095
Patented June 13, 1967

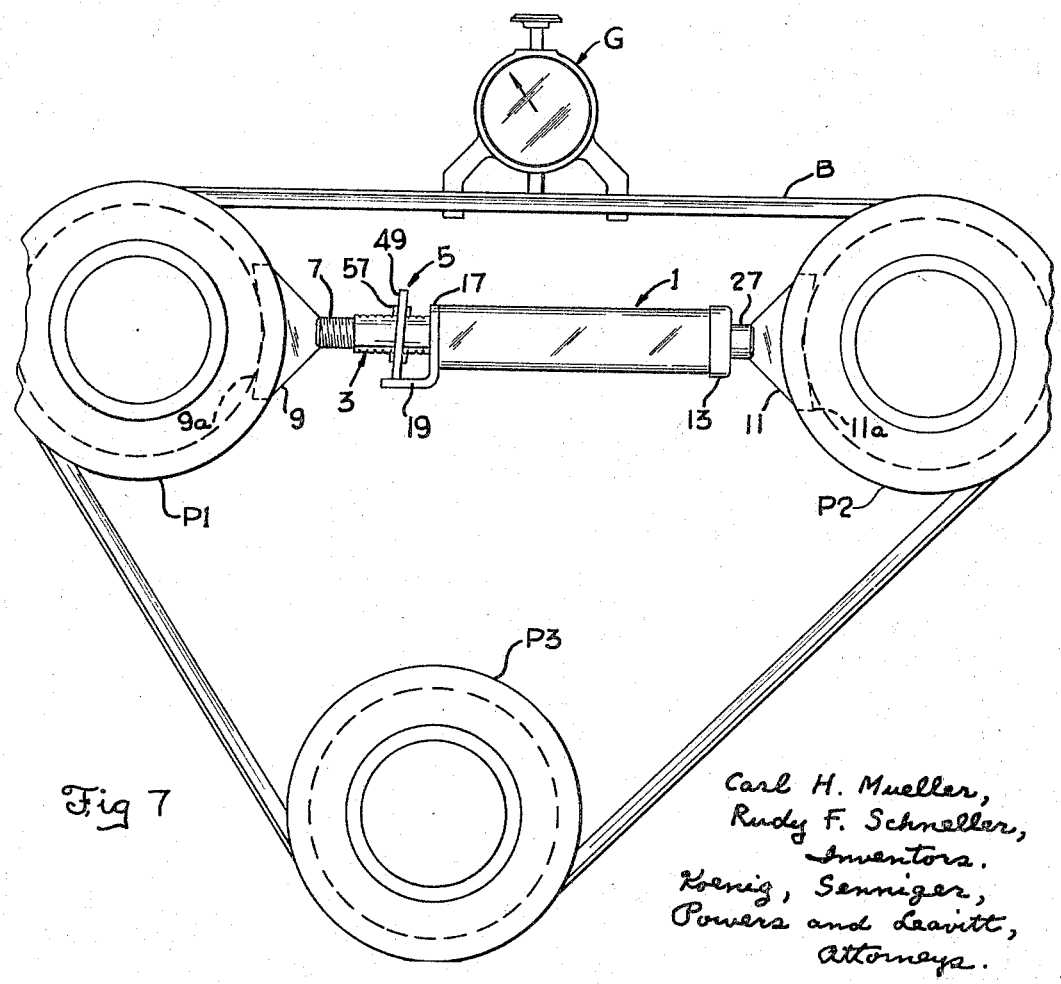

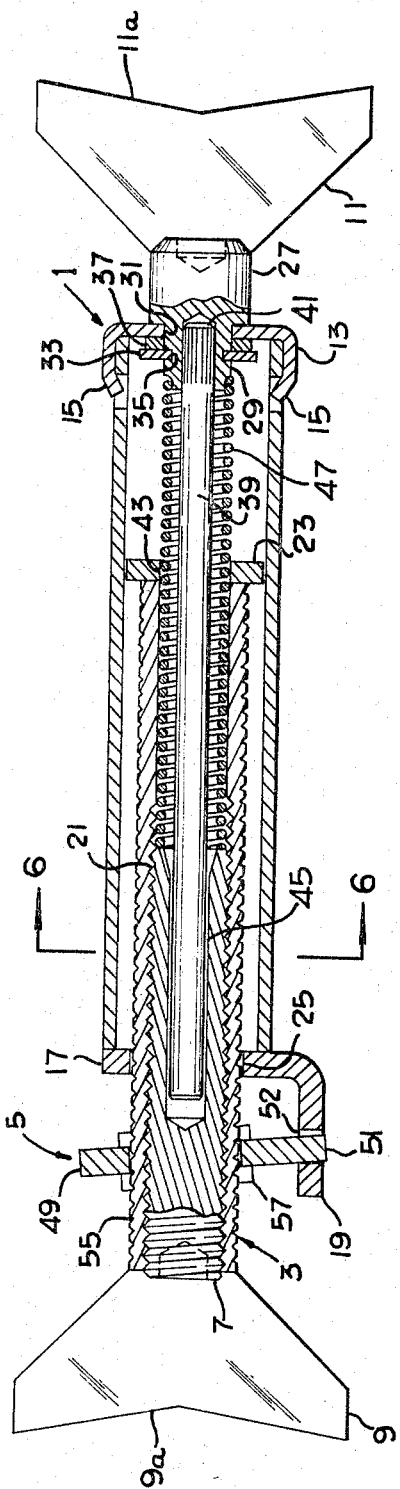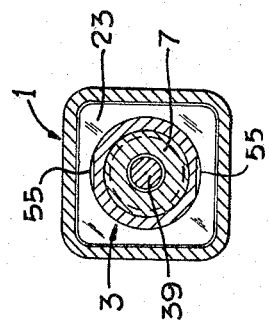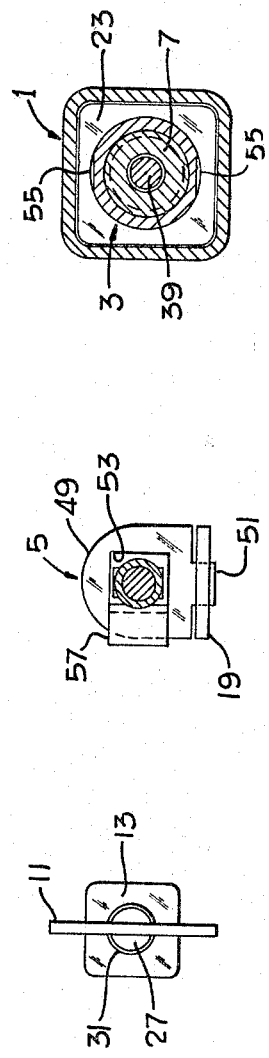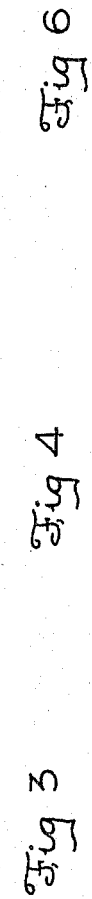

3,325,095
BELT TENSIONER TOOL
Carl H. Mueller, Pasadena Hills, and Rudy F. Schneller, O'Fallon, Mo., assignors to McNeil Corporation, Akron, Ohio, a corporation of Ohio
Filed Oct. 11, 1965, Ser. No. 494,710
12 Claims. (Cl. 254—100)

This invention relates to a belt tensioner tool, and more particularly to a tool of this class for use in adjusting the tension of an endless drive belt such as the fan belt, the generator drive belt, the power steering drive belt or the air conditioner drive belt of an automotive vehicle.

The invention is particularly concerned with a tool for adjusting the tension of the belt of a belt and pulley drive, by adjustment of an adjustably-mounted pulley of the drive, and is particularly useful for adjusting the tension of the belts of belt and pulley drives used in automotive vehicles. Such drives are taken off the crankshaft of the engine of the vehicle for driving the fan of the engine, a generator for the electrical system of the vehicle, a power steering accessory, an air conditioning accessory, etc. Adjustment of such drives to put proper tension on the belts has become increasingly important, particularly on account of loads on the belts becoming heavier, in order to reduce belt wear and increase belt life. In carrying out the operation of adjusting the tension of a belt, it is necessary to adjust an adjustably-mounted pulley of the drive of which the belt constitutes a part, while reading the tension of the belt by means of a tension gauge which is applied to the belt. Conventionally, the operation has involved loosening the bolts of the adjustable mounting for the adjustable pulley, applying the tension gauge to the belt, and using a pry bar to force the adjustably-mounted pulley in belt-tensioning direction to the point where the proper tension is indicated on the gauge. Then the gauge must be released from the belt and reapplied to obtain a correct reading, since static friction of the belt on the gauge affects the reading. While this is being done, constant pressure must be maintained on the pry bar. The operation may have to be repeated several times until a correct reading on the tension gauge is obtained. Then, it is necessary to tighten the bolts, while holding constant pressure on the pry bar. This requires use of both hands, one to exert the proper force on the pry bar while releasing and reapplying the gauge with the other, or while tightening the bolts with the other. In some instances, the bolts have nuts threaded thereon which must be held against turning by a wrench, and this requires in effect a "third hand," which makes the job even more difficult.

Accordingly, among the several objects of this invention may be noted the provision of a belt tensioner tool for accomplishing the purpose described, which is easy to use to adjust the adjustably-mounted pulley of a belt and pulley drive, and which frees both of the mechanic's hands for gauging or tightening bolts, thereby in effect giving the mechanic a third hand; and the provision of a belt tensioner tool such as described which is economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan of a tool constructed in accordance with this invention, showing in phantom the range of extension of the tool;

FIG. 2 is a side elevation of the tool;

FIG. 3 is an end elevation of FIG. 2;

FIG. 4 is a transverse section on line 4—4 of FIG. 2;

FIG. 5 is an enlarged longitudinal section on line 5—5 of FIG. 1;

FIG. 6 is a transverse section on line 6—6 of FIG. 5; and

FIG. 7 is a view showing how the tool is used.

Corresponding reference characters indicate corresponding parts throughout the several views of the drawings.

Referrring to the drawings, a belt tensioner tool of this invention is shown basically to comprise a pair of members designated 1 and 3 assembled for endwise extension of one from the other and endwise retraction of one toward the other to increase and decrease the distance between the outer ends thereof, together with means 5 for releasably holding the members fixed in a retracted position such as shown in solid lines in FIGS. 1, 2 and 5 or in various positions of one relative to the other all the way out to the fully extended position indicated in phantom in FIGS. 1 and 2. A screw 7 is threaded in member 3 for movement endwise thereof on rotation of the members relative to the screw, and has an outer end portion constituted by a flat wing-shaped head 9 located outward of the outer end of member 3. Member 1 has a similar flat wing-shaped head 11 rotatably mounted at its outer end.

As shown, member 1 comprises a length of metal tubing of square cross section suitable for application of a wrench to turn it, and constitutes a hollow handle. A metal end cap 13 is secured on the outer end of this tubular handle 1 as by crimping indicated at 15. This end of the handle may also be referred to as its rearward end. A metal end cap 17 is secured as by welding on the other end (the inner end or forward end) of the handle 1. This cap 17 has a portion bent to extend at right angles to the cap proper forming a foot 19 extending forward from the cap 17 at its bottom.

Member 3 is constituted by a tubular plunger of generally circular cross section which is internally screw threaded as indicated at 21 from its outer forward end and part way toward its inner rearward end. Secured as by welding to the rearward end of the plunger 3 is a head 23 which is of square cross section corresponding to the internal cross section of handle 1 and which is dimensioned for a sliding fit in handle 1. Head 9, which as stated is of flat wing shape, is secured as by welding to the outer end of the screw. Its outer edge is recessed, as indicated at 9a. The outer edge of head 11 is similarly recessed, as indicated at 11a.

Head 11 is on the outer end of a stud 27 having a reduced-diameter extension 29 rotatably mounted in a center hole 31 in cap 13. Stud 27 is held in assembly with cap 13, while being free to rotate therein, by a split retaining ring 33 received in an annular groove 35 in the stud extension 29, with a washer 37 interposed between the retaining ring and the inside face of the cap. A guide rod 39 has one end 41 fixed in a socket at the inner end of the stud 27 and extends through a center hole 43 in head 23 and through the plunger 3, reaching at its other end into a bore 45 in the screw 7, the latter having a rotatable fit on the said other end of the rod. A coil compression spring 47 surrounding the rod reacts from a shoulder on the stud extension 29 against the inner end of the screw 7 to bias the plunger and screw assembly 3, 7 to slide out of the handle (i.e., out of its left end as shown in the drawings).

The plunger and screw assembly 3, 7 is adapted to be latched in a retracted position such as shown in FIGS. 1, 2 and 5 or in various positions of extension thereof relative to the handle by means 5 which comprises a double-acting latch 49 engageable with the plunger 3.

This latch 49 comprises a plate having a tang 51 loosely received in a hole 52 in foot 19 of cap 17 for pivoting the plate on the foot, and having a square hole 53 through which the plunger 3 extends. The plunger 3 is knurled or notched as indicated at 55 along its length on the top and bottom sides thereof opposite the foot 19.

Latch plate 49 carries a friction insert 57, which may be in the form of a U-shaped clip made of a suitable plastic, for rubbing against the plunger to cause the latch plate to follow the plunger. Handle 1 is adapted to be held in the hand with the thumb on the upper free end of the latch plate 49 (which may be rounded, as shown in FIG. 4). The plate 49 will normally occupy a latching position angled forward away from the forward end of the handle. By moving the latch plate 49 with the thumb into a plane generally perpendicular to the plunger axis, the plunger is released to slide out relative to the handle under the bias of the spring 47. The latch plate also functions to hold the plunger 3 from sliding inward into the handle from an extended position of the plunger, as long as the latch plate is left free, by the action of the plunger, as it moves inward a limited distance, rubbing against the insert 57 and swinging the latch plate inward over center to the point where the top and bottom edges of opening 53 in the latch plate engage in notches 55 in the plunger.

FIG. 7 shows one mode of use of the tool for adjusting the tension of a belt indicated at B trained around three pulleys P1, P2, P3 of which pulley P1 is adjustably mounted for the purpose of enabling adjustment of the tension of the belt. Details of the mounting of the pulley P1 are not shown, being conventional. Typically, pulley P1 may be the pulley on a generator of an automotive vehicle, pulley P2 may be the pulley on the fan shaft of the engine, and pulley P3 may be the pulley on the crankshaft of the engine, the generator being pivotally mounted on the engine block by means of a pivot bolt for swinging it to adjust the belt tension, and also having a lock bolt arrangement for locking the generator in adjusted position. As shown in FIG. 7, the tool is positioned between pulleys P1 and P2. Plunger 3 is initially in retracted position, held therein by latch 49 being forward. With the handle 1 grasped in the hand, head 9 is positioned in the groove of pulley P1. Latch 49 is then released with the thumb for extension of handle 1 away from the head 9 and entry of head 11 in the groove of pulley P2. The latch is released for this purpose by moving it rearward (i.e., in the direction toward handle 1) to bring it into a position generally perpendicular to the plunger 3. With the handle 1 grasped in the hand on release of the latch, the extension of handle 1 from head 9 may be controlled to avoid violent fast extension of the handle under the action of spring 47. After head 11 has been entered in the groove of pulley P2, the tool is gently adjusted to be certain that it is in the center position between the pulleys. This may be readily detected by feel. With the thumb off the latch 49, the handle is turned directly with the hand or by means of a wrench (if greater force is necessary) on its axis, which coincides with the axis of the screw 7. The latch 49 is automatically applied to lock the plunger 3 in its position of extension from the handle (i.e., it occupies its FIG. 7 position) as a result of turning the handle due to the friction action of insert 57. Plunger 3, being keyed to the handle by the head 23, rotates with the handle as a unit about the axis of the screw. Head 11 being rotatable relative to the handle, and head 9 being held against rotation in the groove of pulley P1 thereby to hold the screw against rotation, turning of the handle in appropriate direction results in screw 7 being extended endwise from plunger 3 as shown in FIG. 7 to move pulley P1 away from pulley P2 to increase the tension in the belt B. The belt tension is read on a conventional belt tension gauge G applied to the belt, and the handle 1 is turned until the desired belt tension is read on the gauge. Then both hands are free for releasing and re-applying the gauge, if necessary, and another adjustment of the tool may be made to obtain the desired belt tension as shown by the gauge. Then, both hands are free for tightening bolts to lock pulley P1 in adjusted position. To remove the tool from between the pulleys, the handle 1 is turned in the opposite direction to release the load on the latch 49. Then, with the latch held in perpendicular position, the plunger 3 may be pushed into the handle by forcing the handle toward pulley P1, and is automatically latched in retracted position by the latch 49 due to the friction action of insert 57.

While FIG. 7 shows the tool positioned between the two pulleys P1 and P2 with heads 9 and 11 engaged in the grooves of the pulleys, it will be understood that either one of the heads may be engaged against any suitable fixed reaction point and the other engaged against the adjustable pulley, either in the groove of the latter or against a suitable part of the mounting for the pulley. Thus, for example, one head might be engaged against the head of a bolt associated with the engine of an automotive vehicle, and the other engaged with the generator or with the hub of the adjustable pulley.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tool for adjusting the tension of a belt of a belt and pulley drive by adjustment of an adjustably mounted pulley of the drive comprising a pair of members assembled for endwise extension of one from the other and endwise retraction of one toward the other to increase and decrease the distance between the outer ends thereof, means for releasably holding said members fixed in various positions of one relative to the other, and a screw threaded in one of said members for movement endwise thereof on relative rotation of said members and the screw and having an outer end portion outward of the outer end of said one member, said tool being positionable to extend between a fixed reaction point and the adjustably mounted pulley of a drive and said members being extensible for engagement of the projecting end of the screw with said pulley or said reaction point and the outer end of said other member engaging the other of said pulley and said reaction point, said members then being rotatable as a unit about the axis of the screw while the screw remains held against rotation for endwise movement of the screw relative to said members, one of said members being formed for application of a wrench thereto to turn it, said screw having a flat head at its outer end extending endwise of the screw for entry in the groove of a pulley, the other member having a flat formation at its outer end adapted for entry in the groove of a pulley, said flat screw head and said flat formation each having its outer edge recessed for fitting the annular periphery of a pulley in the groove thereof.

2. A tool as set forth in claim 1 having spring means for biasing said one member to extend from the other.

3. A tool for adjusting the tension of a belt of a belt and pulley drive by adjustment of an adjustably mounted pulley of the drive comprising a hollow handle, a head at one end of the handle adapted for engagement in the groove of a pulley, a plunger slidable into and out of the other end of the handle and nonrotatable with respect to the handle, spring means biasing the plunger to slide out of the handle, a screw threaded in the plunger from its outer end, a head on the outer end of the screw adapted for engagement in the groove of a pulley, and latch means for latching the plunger in a retracted position with respect to the handle and for latching the plunger against movement back into the handle from any extended position of the plunger, said latch means being releasable to permit extension of the plunger under the bias of the spring means and to permit retraction of the plunger from any extended position thereof.

4. A tool as set forth in claim 3 wherein said latch means is located at said other end of the handle for actuation by the thumb.

5. A tool as set forth in claim 4 wherein said handle is shaped for application of a wrench to turn it and the plunger.

6. A tool as set forth in claim 5 wherein the head at said one end of the handle is rotatable relative to the handle on the axis of the plunger and screw.

7. A tool for adjusting the tension of a belt of a belt and pulley drive by adjustment of an adjustbly mounted pulley of the drive comprising a hollow handle, a first head at one end of the handle adapted for engagement in the groove of a pulley, a latch plate pivoted at the other end of the handle for rocking movement on an axis transverse to and offset from the handle axis, said plate extending from its pivot across said other end of the handle and having a hole in line with the handle, a plunger slidable into and out of said other end of the handle and non-rotatable with respect to the handle, said plunger extending through said hole in said latch plate, a spring in the handle biasing the plunger to slide out of said other end of the handle, a screw threaded in the plunger from its outer end, and a second head on the outer end of the screw adapted for engagement in the groove of a pulley, said latch plate being adapted to occupy an intermediate position freeing the plunger for movement in either direction, an outer position for latching the plunger against outward movement, and an inner position for latching the plunger against inward movement.

8. A tool as set forth in claim 7 wherein said first head is rotatable relative to the handle on the axis of the plunger and screw.

9. A tool as set forth in claim 8 wherein said handle has a cap at its said one end and said first head has a stud rotary in a hole in said cap.

10. A tool as set forth in claim 9 wherein there is provided a guide rod extending from said stud through said plunger into a bore in said screw.

11. A tool as set forth in claim 10 wherein said spring is a coil compression spring surrounding said rod reacting from said stud against the inner end of said screw.

12. A tool as set forth in claim 7 having friction means between the latch and plunger whereby the latch follows the plunger.

References Cited

UNITED STATES PATENTS

| | | | |
|---|---|---|---|
| 784,890 | 3/1905 | Rue | 254—101 |
| 1,051,144 | 1/1913 | Manny | 254—98 |
| 1,848,476 | 3/1932 | Hall | 254—98 |
| 2,504,291 | 4/1950 | Alderfer | 254—98 |

FOREIGN PATENTS

| | | |
|---|---|---|
| 803,592 | 4/1951 | Germany. |

OTHELL M. SIMPSON, *Primary Examiner.*